(12) United States Patent
Huang et al.

(10) Patent No.: US 8,995,251 B2
(45) Date of Patent: Mar. 31, 2015

(54) NETWORK NODES

(75) Inventors: Yangcheng Huang, Athlone (IE); Daryl Parker, Roscommon (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 482 days.

(21) Appl. No.: 13/123,223

(22) PCT Filed: Oct. 16, 2008

(86) PCT No.: PCT/EP2008/064000
§ 371 (c)(1),
(2), (4) Date: Jun. 30, 2011

(87) PCT Pub. No.: WO2010/043265
PCT Pub. Date: Apr. 22, 2010

(65) Prior Publication Data
US 2011/0255399 A1    Oct. 20, 2011

(51) Int. Cl.
*H04L 1/00* (2006.01)
*H04W 40/24* (2009.01)
(Continued)

(52) U.S. Cl.
CPC .............. *H04W 40/24* (2013.01); *H04W 40/30* (2013.01); *H04L 45/28* (2013.01); *H04W 40/28* (2013.01); *H04L 45/023* (2013.01)
USPC ........... 370/221; 370/351; 370/389; 370/242; 370/252; 370/282; 710/107

(58) Field of Classification Search
USPC ................. 370/351, 389, 242, 252, 282, 221; 710/107
See application file for complete search history.

(56) References Cited

U.S. PATENT DOCUMENTS

| 6,961,313 | B1 * | 11/2005 | Gaspar | 370/242 |
| 2003/0179742 | A1 * | 9/2003 | Ogier et al. | 370/351 |

FOREIGN PATENT DOCUMENTS

| JP | 11252103 A | 9/1999 |
| JP | 11261599 A | 9/1999 |

(Continued)

OTHER PUBLICATIONS

PCT International Search Report, mailed Jun. 18, 2009, in connection with International Application No. PCT/EP2008/064000.
(Continued)

*Primary Examiner* — Helal A Algahaim
*Assistant Examiner* — Mahmoud Ismail
(74) *Attorney, Agent, or Firm* — Leffler Intellectual Property Law, PLLC (57) ABSTRACT

A network node comprising at least one network interface the network node arranged to form network links to other network nodes through the or each network interface, each network link being to a neighboring one of the other network nodes, the network node arranged to determine whether data transmitted over the links to the relevant neighboring network nodes is successfully received. Should the network node make a first determination that data sent over a given network link to a neighboring node has not been successfully received, the network node temporarily disables the entry for that network link in a memory for a period of time, such that the network node does not send data to the neighboring node over the given network link during the period of time, but then subsequently re-enables the entry after the period of time has elapsed. Should the network node make a subsequent determination that data sent over the given network link to the neighboring network node has not been successfully received, the network node deletes the entry from the memory.

20 Claims, 4 Drawing Sheets

(51) Int. Cl.
  *H04L 12/703*   (2013.01)
  *H04L 12/757*   (2013.01)
  *H04L 12/28*   (2006.01)
  *H04J 1/16*   (2006.01)
  *H04J 3/14*   (2006.01)
  *H04L 12/26*   (2006.01)
  *H04B 1/44*   (2006.01)
  *G06F 13/00*   (2006.01)
  *H04W 40/30*   (2009.01)
  *H04W 40/28*   (2009.01)

(56) References Cited

FOREIGN PATENT DOCUMENTS

| JP | 2003349742 A | 12/2000 |
| JP | 2003102057 A | 4/2003 |
| JP | 2007251991 A | 9/2007 |
| JP | 2008533809 A | 8/2008 |

OTHER PUBLICATIONS

Obelheiro, R. R. et al. "A Lightweight Intrusion-Tolerant Overlay Network" Object and Component-Oriented Real-Time Distributed Computing, 2006. I SORC 2006. Ninth IEEE International Symposium on, Gyeongju, Korea, Apr. 24-26, 2006, Piscataway, New Jersey, USA, IEEE, Apr. 24, 2006, pp. 496-503, XP010916598, ISBN: 978-0-7695-2561-7.

Altalhi, A. H. et al. "Virtual paths routing: a highly dynamic routing protocol for ad hoc wireless networks" Pervasive Computing and Communications Workshops, 2004. Proceedings of the Second IEEE Annual Conference on, Piscataway, New Jersey, USA, IEEE, Mar. 14, 2004, pp. 81-86, XP010689733, ISBN: 978-0-7695-2106-0.

Clausen et al. "Mobile Ad hoc Networking (MANET) Neighbourhood Discovery Protocol (NHDP) draft ietf-manet-nhdp-07" Internet Engineering Task Force, Jul. 10, 2008.

Japanese Office Action, mailed Jan. 15, 2013, in connection with Japanese Patent Application No. 2011-531365 (see translation below).

Translation of Japanese Office Action, mailed Jan. 15, 2013, in connection with Japanese Patent Application No. 2011-531365.

Clausen, T. et al. "Manet Neighborhood Discovery Protocol (NHDP)" Work in Progress draft-ietf-manet-nhdp-04, Jun. 29, 2007, the IETF Trust, 2007, pp. 1-49.

Clausen, T. et al. "The Optimized Link State Routing Protocol" RFC 3626, Oct. 2003, the Internet Society, 2003, pp. 1-66.

Perkins, C. et al. "Ad hoc On-Demand Distance Vector (AODV) Routing", Internet Draft draft-perkins-manetaodvbis-00.txt, Oct. 29, 2003, IETF, pp. 1-30.

Chakeres, I. et al. "Mobile Ad hoc Networks (MANET) Minutes" IETF69, Jun. 25, 2007, pp. 1-3.

\* cited by examiner

Fig 5

NETWORK NODES

TECHNICAL FIELD

This invention relates to a network node, a network of network nodes and a method of operating a network node, particularly, but not exclusively, as may be employed in wireless mesh networks.

BACKGROUND

Wireless mesh networks (WMNs) are multi-hop infrastructure-less networks characterized by dynamic self-organization, self-configuration and self-healing. These factors allow WMNs to support fast, reliable and cost-effective network deployment in very diverse environments, and provide better coverage and capacity to stationary and mobile users. Correspondingly, WMNs can host a wide range of applications in disaster recovery, commercial and private settings. One typical example is the Ericsson Response program, which uses WMN infrastructure to enhance robustness and quick deployment of transportable cellular networks, and provide effective and robust services in disaster rescue and other mission-critical scenarios.

In wireless mesh networks in particular, and in other networks, it is desirable for each network node to be able to determine to which nodes it has direct links; those are its neighbours. Existing neighbour detection schemes are based on a soft-state mechanism by exchanging periodical heartbeat (i.e. HELLO) messages, such as are described "Mobile Ad hoc Networking (MANET) Neighbourhood Discovery Protocol (NHDP)—draft-ietf-manet-nhdp-07", Clausen et al, Internet Engineering Task Force, available at http://tools.ietf.org/html/draft-ietf-manet-nhdp-07. Each node in wireless mesh networks generates periodic HELLO messages for each of its interfaces. Each HELLO message identifies that interface, and reports the other interfaces of the node. Each HELLO message contains information from the link repository of the interface information base of the interface, and from the node repository of the node.

HELLO messages are sent proactively at a regular interval, known as HELLO_INTERVAL. The interval can be fixed or dynamic. For example, the interval can be backed off in order to reduce network congestion caused by control traffic. HELLO messages can also be sent in a reactive way, as a response to a change in the node itself or its neighbours.

If the HELLO messages from the neighbours are not received within a specific interval (known as Neighbour_Expiration_Interval), the node would assume its neighbour unreachable.

Due to the simplicity and robustness, most of existing routing protocols such as Optimised Link State Routing Protocol (OLSR) and Ad Hoc on Demand Distance Vector (AODV) routing use this neighbour detection scheme.

If link layer information describing connectivity to neighbouring nodes is available (i.e., loss of connectivity such as through absence of a link layer acknowledgment), this information can be used in addition to the information from the HELLO-messages to maintain the neighbour status.

For example, failure to transmit a packet after the maximum number of retransmission attempts in IEEE 802.11 results in an indicator signifying a failed transmission. This indicates the loss of the link to the active next hop. Upon receiving such a notification, the node removes the neighbouring nodes from its neighbour repository.

In addition to HELLO messages, an Ad Hoc on Demand Distance Vector (AODV) [4] node determines neighbour status by passively listening for packets from its neighbours. If a valid route to a neighbour exists but no data packets from that neighbour have been received for more than (ALLOWED_HELLO_LOSS*HELLO_INTERVAL) milliseconds, the node assumes that the link to this neighbour is currently lost.

The major concern about the HELLO based neighbour detection scheme is the detection latency. The node has to wait until the neighbour state timer expires before it senses the neighbour changes. In typical implementations this timeout is in the region of around 6 seconds. Such latency is usually not acceptable.

Another concern raised very recently is that the size of the Hello messages might be too large. Since bandwidth is scarce in wireless networks, periodic messages should be small.

Notifications from the link layer might lead to false neighbour removal. In addition to link breakage or neighbour loss, link-layer notification can be triggered by some other reasons, such as channel congestion. A link might be falsely removed when the channel to a neighbouring node is congested.

Passively Monitoring Data Flows is clearly not applicable when there is no data transmission in the nodes or the network. Otherwise, the neighbour repository of the nodes would slowly "churn" as neighbours are discovered and then timeout if there is no data traffic is transmitted.

SUMMARY

According to a first aspect of the invention, there is provided a network node, comprising at least one network interface by means of which the network node is connectable to other network nodes, in which the network node is arranged to form network links to the other network nodes through the or each network interface, each network link being to a neighbouring one of the other network nodes, in which the network node is arranged to determine whether data transmitted over the links to the relevant neighbouring network nodes is successfully received, in which the network node comprises a memory arranged to record, in use, an entry for each of the network links, each entry comprising data relating to the identity of the neighbouring network node to which each network link is connected, the network node being arranged to send data to the other network nodes dependent upon the entries in the memory, in which, the network node is arranged such that, should the network node make a first determination that data sent over a given network link to a neighbouring node has not been successfully received, the network node temporarily disables the entry for that network link in the memory for a period of time, such that the network node does not send data to the neighbouring node over the given network link during the period of time, but then subsequently re-enables the entry after the period of time has elapsed so as to enable the network node to send data to the neighbouring network node over the given network link, and in which the network node is arranged such that, should the network node make a subsequent determination that data sent over the given network link to the neighbouring network node has not been successfully received, the network node deletes the entry from the memory, such that the network node no longer treats the neighbouring network node as a neighbouring network node and transmits no further data over the given network link.

This enables a transient problem to be disregarded, without going to the step of completely deleting the connection, whilst still being able to delete connections which clearly are no longer extant. Detection of link losses is more accurate.

The network node may be arranged such that, on at least one intervening determination, between the first and subsequent determinations, that data sent over a given network link to a neighbouring node has not been successfully received, the network node temporarily disables the entry for that network link in the memory for a period of time, such that the network node does not send data to the neighbouring node over the given network link during the period of time, but then subsequently re-enables the entry after the period of time has elapsed so as to enable the network node to send data to the neighbouring network node over the given network link. Thus, the system may disable an entry multiple times before finally deleting the entry.

The period of time that the disablement of the entry lasts may be different for the first and intervening determinations. Preferably, the period of time increases for each successive determination. The subsequent determination may be made once the period of time reaches a threshold. In such a case, the period of time may increase exponentially with each successive determination. This exponential backoff is useful, as it allows for some repeated attempts to use a neighbouring node should a temporary problem, such as channel contentions, afflict a given link, but appreciates the multiplicative increase in probability that a link is no longer function given repeated failures.

The network node may be arranged only to make a determination when data is repeatedly not successfully received. The network node may comprise a failure counter, the network node being arranged to increment the counter every time data is not successfully received and to make the determination when the counter reaches a threshold.

Such statistical processing may have the benefits that it avoids a sharp increase in the overhead of processing failure notifications (as they are only sent once a link has repeatedly failed) and avoiding false notifications caused by occasional packet failure (packet failure being generally more prevalent with wireless network than conventional wired ones).

The memory may be arranged so as to store as part of each entry, in use, the current period of time and the number of determinations so far made. The network node may also comprise a multiplier, arranged to multiply the entry relating to the current period of time by an exponential factor based upon the contents of the memory relating to the number of determinations should a determination occur, and to store that as the new period of time. The network node may also comprise comparison means arranged to determine whether the new period of time is greater than the threshold.

This invention is particularly applicable to wireless networks and in particular wireless mesh networks, given the effect that the environment can have on such links as compared to wired networks. As such, the or each network interface may be a wireless network interface.

The network node may comprise a memory for storing a routing table, which the network node uses to determine how to send data to the other nodes in a network and a routing processor arranged to update the routing table upon each determination or reenablement of an entry.

The network node may be arranged such that, on a determination, the data in question is resent via another network link based upon the routing table as updated after the determination. The network node may be arranged to do this up to a predetermined maximum number of times for a given packet of data.

According to a second aspect of the invention, there is provided a network, comprising a plurality of network nodes according to the first aspect of the invention. Optionally, the network may comprise other network nodes, not according to the first aspect of the invention.

According to a third aspect of the invention, there is provided a method of operating a network node in a network of other network nodes, comprising the steps of:
  forming network links to other network nodes through a network interface of the network node, each network link being to a neighbouring one of the other network nodes,
  storing a an entry in the network node for each of the network links, each entry comprising data relating to the identity of the neighbouring network node to which each network link is connected,
  sending data over the network links dependent upon the entries,
  and determining whether data sent over the network links is successfully received,
  in which the method further comprises, on a first determination that data sent over a given network link to a neighbouring node has not been successfully received, temporarily disabling the entry for that network link for a period of time, such that the network node does not send data to the neighbouring node over the given network link during the period of time, but then subsequently re-enabling the entry after the period of time has elapsed so as to enable the network node to send data to the neighbouring network node over the given network link,
  and, on a subsequent determination that data sent over the given network link to the neighbouring network node has not been successfully received, deleting the entry, such that the network node no longer treats the neighbouring network node as a neighbouring network node and transmits no further data over the given network link.

The method may also comprise the step of on at least one intervening determination, between the first and subsequent determinations, that data sent over a given network link to a neighbouring node has not been successfully received, temporarily disabling the entry for that network link for a period of time, such that the network node does not send data to the neighbouring node over the given network link during the period of time, but then subsequently re-enabling the entry after the period of time has elapsed so as to enable the network node to send data to the neighbouring network node over the given network link. Thus, the system may disable an entry multiple times before finally deleting the entry.

The period of time that the disablement of the entry lasts may be different for the first and intervening determinations. Preferably, the period of time increases for each successive determination. The subsequent determination may be made once the period of time reaches a threshold. In such a case, the period of time may increase exponentially with each successive determination. This is useful, as it allows for some repeated attempts to use a neighbouring node should a temporary problem, such as channel contentions, afflict a given link, but appreciates the increase in probability that a link is no longer function given repeated failures.

The network node may be arranged only to make a determination when data is repeatedly not successfully received. The network node may comprise a failure counter, the network node being arranged to increment the counter every time data is not successfully received and to make the determination when the counter reaches a threshold.

Such statistical processing may have the benefits that it avoids a sharp increase in the overhead of processing failure notifications (as they are only sent once a link has repeatedly failed) and avoiding false notifications caused by occasional packet failure (packet failure being generally more prevalent with wireless network than conventional wired ones).

This invention is particularly applicable to wireless networks and in particular wireless mesh networks, given the effect that the environment can have on such links as compared to wired networks. As such, the or each network interface may be a wireless network interface.

The method may comprise storing a routing table, which the network node uses to determine how to send data to the other nodes in a network and a routing processor arranged to update the routing table upon each determination or reenablement of an entry.

The method may comprise resending, on a determination, the data in question on another network link based upon the routing table as updated after the determination. The method may comprise resending the data up to a predetermined maximum number of times for a given packet of data.

DETAILED DESCRIPTION

Figure 1:
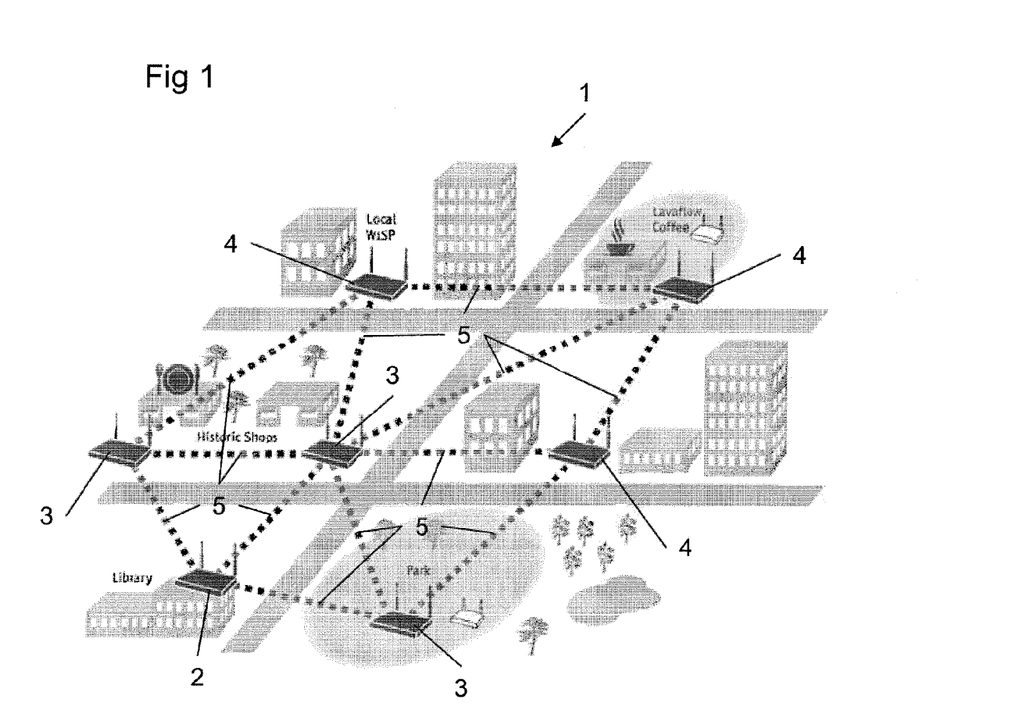
FIG. 1 shows an example wireless mesh network employing network nodes according an embodiment of the present invention.

FIG. 1 shows a wireless mesh network 1, which comprises a plurality of network nodes 2, 3, 4 according to a first embodiment of the invention.

The network 1 is spread out over a neighbourhood of a city, encompassing a park, a library, some shops, a coffee house and a Wireless Internet Service Provider (WISP). Each node is connected to its neighbours by wireless links 5. For a given node, say the network node 2 in the library, those nodes to which the network node 2 have a direct link 5 are known as the neighbouring network nodes 3; they are connected directly to the network node by only one network "hop". The remaining network nodes, which are only connected to the network node 2 by multiple hops, are the non-neighbouring network nodes 4; the network node 2 must communicate with them by transmitting data via one of the neighbouring network nodes 3.

Figure 2:
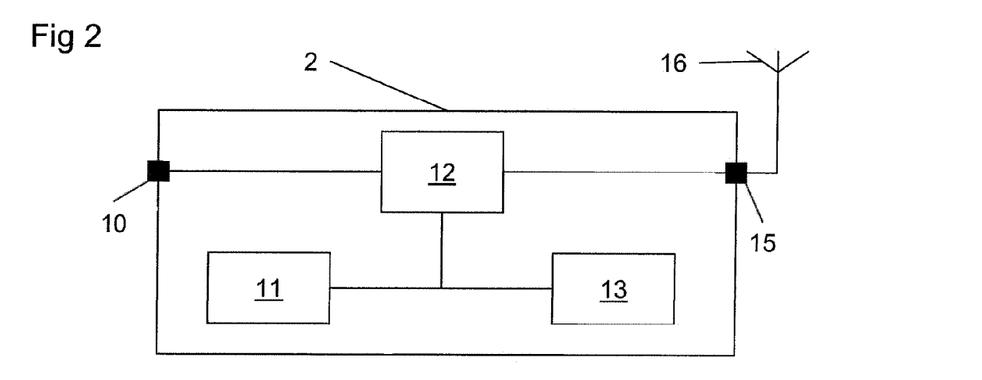
FIG. 2 shows schematically a network node of the first embodiment of the invention, as used in the network of FIG. 1.

FIG. 2 shows a schematic diagram of the network node 2 according to the first embodiment of the invention. It comprises a data interface 10 on which data to be sent and received by the node is provided by and for a computing apparatus (not shown), and a wireless network interface 15 on which such data is transmitted or received. The wireless interface is typically an IEEE 802.11 a/b/g (WIFI) or IEEE 802.16 (WiMAX) compliant interface, and is connected to an antenna 16.

The node 2 also comprises a routing processor 12, which takes the input data in packet form, each data packet indicating which network node it is for. As is common in routing, the processor works out to which of the neighbouring nodes 3 it should send each packet of data. To do this, it uses a routing table 13 held in a memory of the node 2. This table indicates which network nodes can be reached through which neighbouring network nodes.

The network node also stores in its memory a table 11 of the neighbouring network nodes 3 to which it is connected. As new nodes join the network, this table will be updated. The nature of the entries in the table will be discussed in more detail below.

Figure 3:
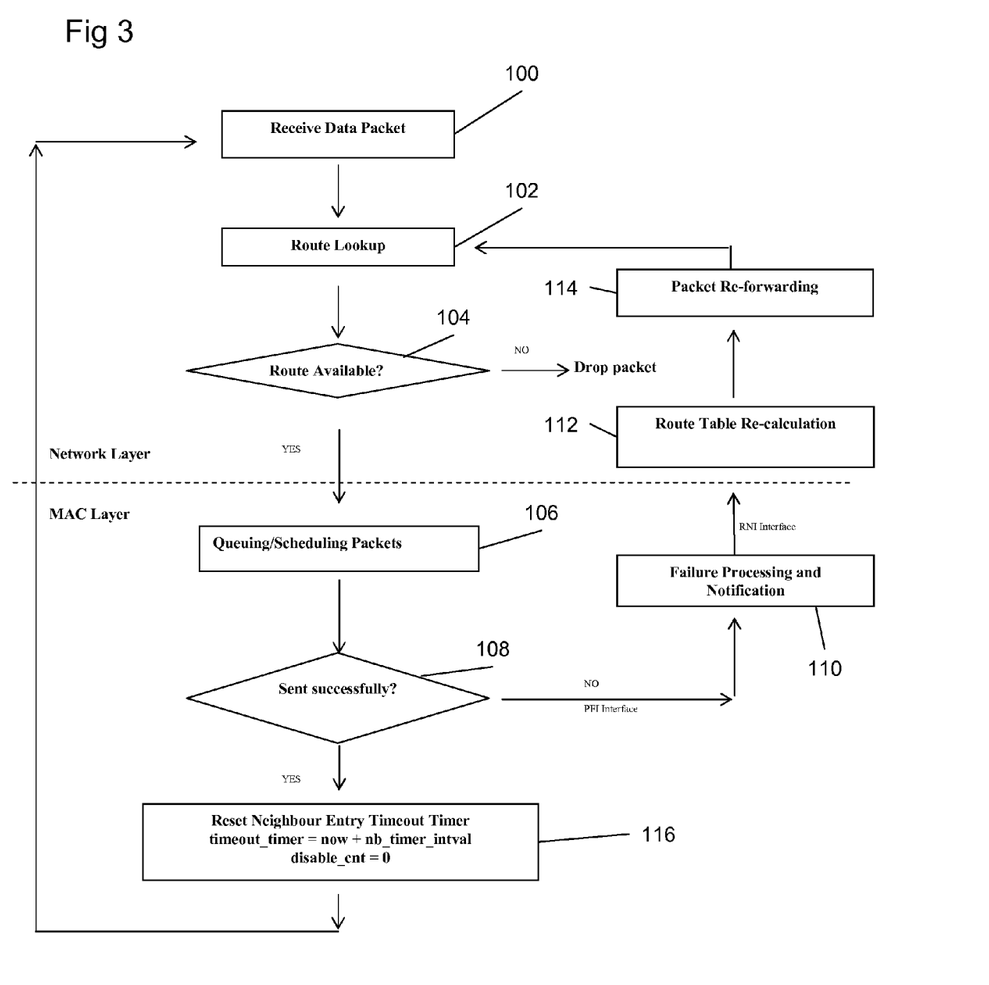
FIG. 3 shows a flowchart showing the transmission of packets from the nodes of FIG. 2.

The functioning of the network node when it receives a data packet for onward transmission is shown in FIG. 3 of the accompanying drawings. At step 100, the network node receives a data packet on data interface 10. The routing processor 12 then, at step 102, looks up the destination for the packet in the routing table 13 and decides at step 104 whether there is an appropriate neighbouring node 3 to send the packet to. If there is not, then the packet is dropped at step 106.

If there is, then the routing processor 12 selects the appropriate neighbour and queues the packet for sending at step 106. Once the packet has been sent, the network node determines (at step 108) whether the packet was sent successfully. It does this by listening for an acknowledgement from the neighbouring node to which the packet was sent, or in an alternative embodiment from its own MAC layer (which can also send acknowledgements to its routing process to confirm whether a packet has been dispatched successfully). If no acknowledgement is received, the network node enters the failure processing mode at step 110, and shown in more detail in FIG. 4. The packet forwarding process of the operating system of the network node initiates this method through a packet failure interface (PFI) also implemented by the operating system.

Figure 4:
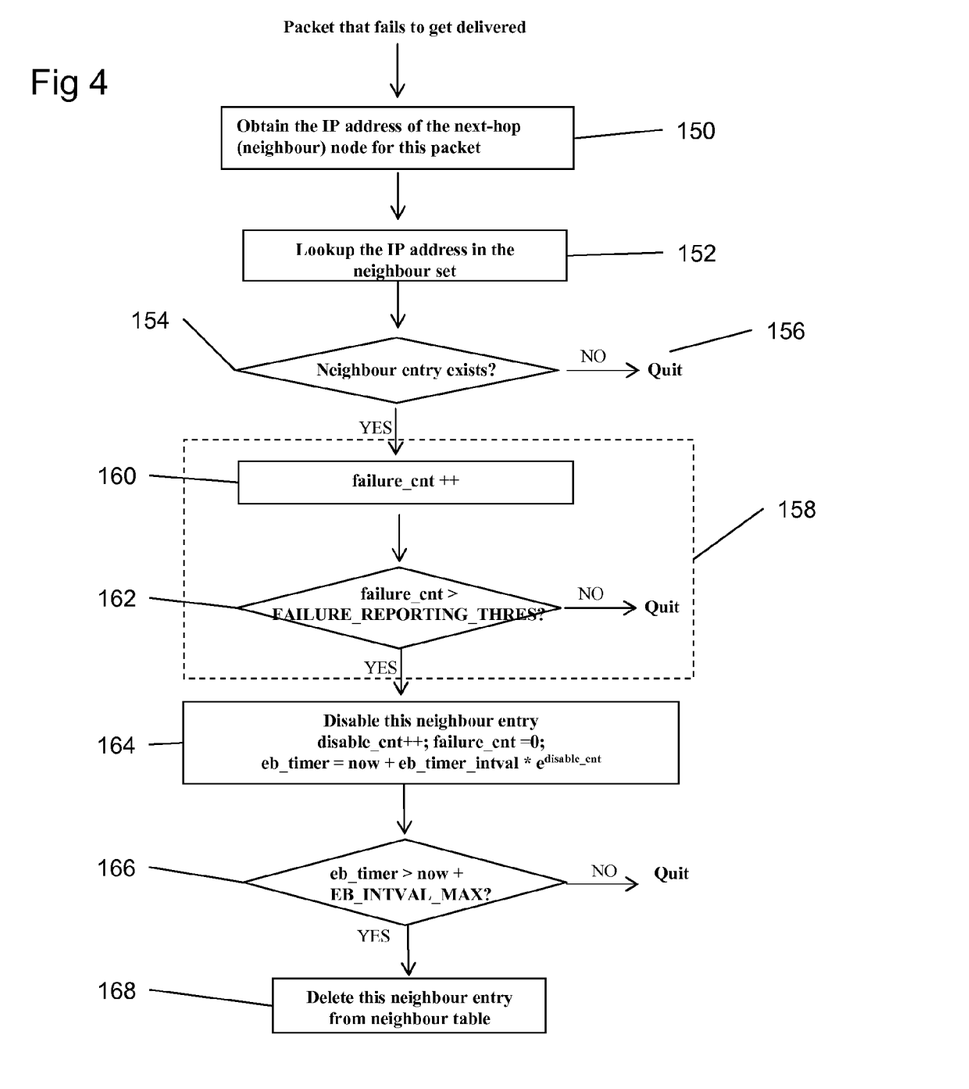
FIG. 4 shows a flowchart showing the packet failure operation of the network node of FIG. 2.
Figure 5:
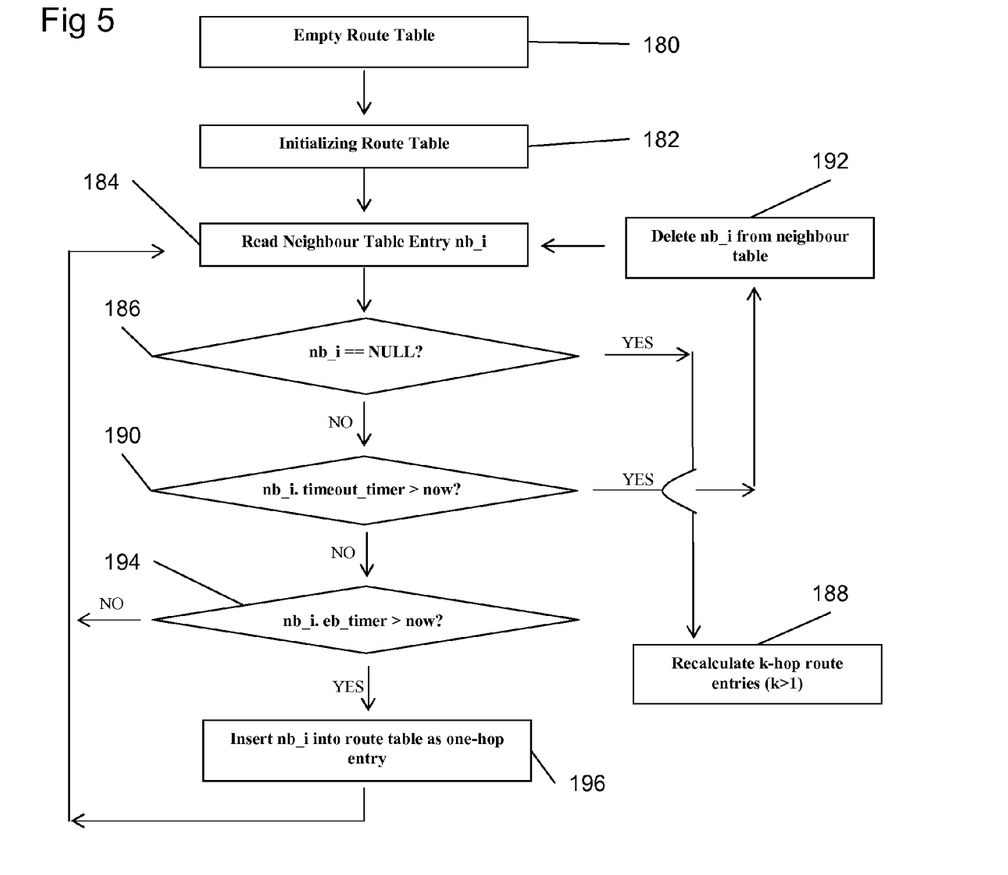
FIG. 5 shows a flowchart showing the rerouting operation of the network node of FIG. 2.

This failure processing method commences at step 150, where the network node determines the address of the neighbouring node 3 to which the failed packet was sent. This is then compared against the neighbour list 11 to find the entry relating to the appropriate neighbouring node 3 and associated link at step 152. A check is made at step 154 to ensure that an entry exists; if it does not, then the link to the neighbour has already been deactivated and so no further action is required of the failure processing method, and at step 156 the method reverts to that of FIG. 3.

Assuming that an entry exists for the neighbouring node 3 in the list 11, the failure processing method proceeds. The next two statistical processing steps 158 are optional. In these steps, the variable failure cnt for that entry, which counts the number of failures for that link, is incremented at step 160. Then, at step 162, the failure_cnt counter is compared to a threshold FAILURE_REPORTING_THRES. If the number of failures indicated by failure_cnt is not more than the threshold, then insufficient errors have occurred yet to take any action, and the failure processing method takes no further action, and control reverts to FIG. 3.

However, if the threshold has been reached or the statistical processing steps are not employed, then at step 164 the entry in the list 11 is temporarily disabled; as will be described below, this occurs due to setting a deactivation timer to after the present time. Various items of data in the entry are also updated: disable_cnt, which counts the number of times an entry has been disabled, is incremented, and eb_timer, which indicates the time at which the entry should be re-enabled, is set to the present time, plus a disablement period of time of $eb\_timer\_intval \cdot e^{disable\_cnt}$, where eb_timer_intval is a constant time and e is the exponential constant (2.718 . . . ). If the statistical steps 158 are employed, the number of failures failure_cnt is reset to zero.

At step 166, the disablement period of time is checked against a threshold EB_INTVAL_MAX. If it is greater than this threshold, then at step 168, the neighbour entry in the list 11 is deleted. This means that the link between the node 2 and the relevant neighbour node 3 is broken, and no further data will be sent over that link. The method then reverts to FIG. 3.

If the disablement period of time is less than the threshold, then the method simply reverts to that of FIG. 3.

Whatever the outcome of the failure processing method shown in FIG. 4, one that method has completed, the overall method shown in FIG. 3 then proceeds to step 112. In this, the routing processor is notified on a routing notification interface (RNI) that the routing table must be updated. The routing table is recalculated as is shown in more detail in FIG. 4.

At step 180, the present routing table 13 is emptied, and at step 182 is populated with entries for the neighbour nodes from list 11. Accordingly, the routing table will be updated without any neighbour nodes that were deleted at step 168.

At step 184, the method starts stepping through each entry in the routing table, and determines at step 186 whether the entry it is currently determining is the end of table marker NULL; if so, the routing table now has routes for all appropriate neighbouring nodes 3 and so the routing algorithm can be used to determine (step 188) routes to the non-neighbouring nodes 4 using an appropriate algorithm.

Otherwise, the method proceeds to step 190, where the method determines whether a timeout timer has been exceeded for the present neighbouring node. The timeout timer indicates the time since a HELLO message or data packet acknowledgement has been received from the neighbouring node and so serves as a backup check that the relevant link 5 is active. If the timeout timer has been exceeded, then at step 192 the node is deleted from both the neighbour list 11, the node is not added to the routing table and the method moves to the next entry in the routing table.

Otherwise, the routing processor checks, at step 194, whether the time eb_timer is greater than the current time; if it is then the node has been disabled and so is not to be added to the routing table. Thus are disabled nodes disabled from being directly sent data; they are excluded from the routing table based upon whether the time given by eb_timer has passed. The method then proceeds to the next entry in the routing table.

If eb_timer is in the past, then the entry in the neighbour list has not been disabled and so can be used as a first hop—the entry still relates to a neighbouring node 3. Accordingly, at step 196, an entry is made in the routing table indicating that the neighbouring node can be reached directly.

Once the routing table has been recalculated, it can be determined whether the data packet should be retransmitted (step 114, FIG. 3). Given that the routing table may have changed since the last time the packet was transmitted, an alternative route may be more successful. Each packet will be passed back to the routing lookup step (step 102) a limited number of times, up to a maximum MAX_REFWD_TIME. The number of times retransmission has been attempted can be recorded in the header of the packet. If the number of times is exceeded, the packet is dropped.

If the network node determines at step 108 above that the packet was sent successfully, then the link to the neighbour node 3 is functioning. According, at step 116, the timeout_timer is reset to the present time plus a predetermined interval nb_timer_interval, and the disable_cnt variable which describes the number of times that the link has been disabled is set to zero. The network node 2 then awaits the next packet.

The invention claimed is:

1. A network node, comprising at least one network interface by means of which the network node is connectable to other network nodes, in which the network node is arranged to form network links to the other network nodes through the at least one network interface, each network link being to a neighbouring one of the other network nodes, in which the network node is arranged to determine whether data transmitted over the links to the relevant neighbouring network nodes is successfully received,
   wherein the network node comprises a memory arranged to record, in use, an entry for each of the network links, each entry comprising data relating to the identity of the neighbouring network node to which each network link is connected, the network node being arranged to send data to the other network nodes dependent upon the entries in the memory,
   wherein the network node is arranged such that, should the network node make a first determination that data sent by the network node over a given network link to a neighbouring node has not been successfully received by the neighbouring node, the network node temporarily disables the entry for that network link in the memory for a period of time, such that the network node does not send data to the neighbouring node over the given network link during the period of time, but then subsequently re-enables the entry after the period of time has elapsed so as to enable the network node to send data to the neighbouring network node over the given network link,
   and wherein the network node is arranged such that, should the network node make a subsequent determination that data sent by the network node over the given network link to the neighbouring network node has not been successfully received by the neighbouring node, the network node deletes the entry from the memory, such that the network node no longer treats the neighbouring network node as a neighbouring network node and transmits no further data over the given network link.

2. The network node of claim 1, arranged such that, on at least one intervening determination, between the first and subsequent determinations, that data sent over a given network link to a neighbouring node has not been successfully received, the network node temporarily disables the entry for that network link in the memory for a period of time, such that the network node does not send data to the neighbouring node over the given network link during the period of time, but then subsequently re-enables the entry after the period of time has elapsed so as to enable the network node to send data to the neighbouring network node over the given network link.

3. The network node of claim 2, in which the period of time that the disablement of the entry lasts is different for the first and intervening determinations.

4. The network node of claim 3, in which the period of time increases for each successive determination.

5. The network node of claim 4, in which the period of time increases exponentially with each successive determination.

6. The network node of claim 3, in which the subsequent determination is made once the period of time reaches a threshold.

7. The network node of claim 1, arranged only to make a determination when data is repeatedly not successfully received.

8. The network node of claim 7, comprising a failure counter, the network node being arranged to increment the counter every time data is not successfully received and to make the determination when the counter reaches a threshold.

9. The network node of claim 1, in which the or each network interface is a wireless network interface.

10. The network node of claim 1, comprising a memory for storing a routing table, in which the network node is arranged to store a routing table in use, in order to determine how to send data to the other nodes in a network, the network node comprising a routing processor arranged to update the routing table upon each determination or re-enablement of an entry.

11. The network node of claim 1, arranged such that, on a determination, the data in question is resent via another network link based upon the routing table as updated after the determination.

12. The network node of claim 11, arranged to resend each packet of data up to a predetermined maximum number of times.

13. A network, comprising:
a plurality of network nodes, wherein each of the network nodes comprises at least one network interface by means of which the network node is connectable to other ones of the network nodes, in which each of the network nodes is arranged to form network links to the other network nodes through the at least one network interface, each network link being to a neighbouring one of the other network nodes, in which the network node is arranged to determine whether data transmitted over the links to the relevant neighbouring network nodes is successfully received,
wherein each network node comprises a memory arranged to record, in use, an entry for each of the network links, each entry comprising data relating to the identity of the neighbouring network node to which each network link is connected, the network node being arranged to send data to the other network nodes dependent upon the entries in the memory,
wherein each of the network nodes is arranged such that, should the network node make a first determination that data sent by the network node over a given network link to a neighbouring node has not been successfully received by the neighboring node, the network node temporarily disables the entry for that network link in the memory for a period of time, such that the network node does not send data to the neighbouring node over the given network link during the period of time, but then subsequently re-enables the entry after the period of time has elapsed so as to enable the network node to send data to the neighbouring network node over the given network link,
and wherein each of the network nodes is arranged such that, should the network node make a subsequent determination that data sent by the network node over the given network link to the neighbouring network node has not been successfully received by the neighbouring node, the network node deletes the entry from the memory, such that the network node no longer treats the neighbouring network node as a neighbouring network node and transmits no further data over the given network link.

14. A method of operating a network node in a network of other network nodes, the method comprising the steps of:
forming network links to other network nodes through a network interface of the network node, each network link being to a neighbouring one of the other network nodes;
storing an entry in the network node for each of the network links, each entry comprising data relating to the identity of the neighbouring network node to which each network link is connected;
sending data over the network links dependent upon the entries; and
determining whether data sent over the network links is successfully received,
wherein the method further comprises:
on a first determination that data sent by the network node over a given network link to a neighbouring node has not been successfully received by the neighbouring node, temporarily disabling the entry for that network link for a period of time, such that the network node does not send data to the neighbouring node over the given network link during the period of time, but then subsequently re-enabling the entry after the period of time has elapsed so as to enable the network node to send data to the neighbouring network node over the given network link; and
on a subsequent determination that data sent by the network node over the given network link to the neighbouring network node has not been successfully received by the neighbouring node, deleting the entry, such that the network node no longer treats the neighbouring network node as a neighbouring network node and transmits no further data over the given network link.

15. The method of claim 14, comprising the step of on at least one intervening determination, between the first and subsequent determinations, that data sent over a given network link to a neighbouring node has not been successfully received, temporarily disabling the entry for that network link for a period of time, such that the network node does not send data to the neighbouring node over the given network link during the period of time, but then subsequently re-enabling the entry after the period of time has elapsed so as to enable the network node to send data to the neighbouring network node over the given network link.

16. The method of claim 15, in which the period of time that the disablement of the entry lasts is different for the first and intervening determinations.

17. The method of claim 16, in which the period of time increases, preferably exponentially, for each successive determination.

18. The method of claim 16, in which the subsequent determination is made once the period of time reaches a threshold.

19. The method of claim 14, in which a determination is only made when data is repeatedly not successfully received.

20. The method of claim 14, comprising storing a routing table, using the routing table to determine how to send data to the other nodes in a network and updating the routing table upon each determination or re-enablement of an entry.

* * * * *